United States Patent [19]

Campos

[11] Patent Number: 5,018,381
[45] Date of Patent: May 28, 1991

[54] APPARATUS FOR CHECKING AIR LEAKS IN VEHICLE TIRE RIMS

[76] Inventor: Trineu Campos, Anhanguera Highway, KM 147, Limeira, Sao Paulo, Brazil

[21] Appl. No.: 406,893

[22] Filed: Sep. 12, 1989

[30] Foreign Application Priority Data

Sep. 12, 1988 [BR] Brazil ............................. PI 8804683

[51] Int. Cl.⁵ ............................................. G01M 3/06
[52] U.S. Cl. ........................................... 73/45.5; 73/49
[58] Field of Search ........................ 73/45.5, 41.2, 49

[56] References Cited

U.S. PATENT DOCUMENTS

| | | | |
|---|---|---|---|
| 1,456,094 | 3/1923 | Chalmers | 73/45.5 |
| 2,432,814 | 12/1947 | Schmidt | 73/45.5 |
| 2,949,767 | 8/1960 | Foust | 73/49 |
| 3,418,845 | 12/1968 | Helms | 73/45.5 |
| 3,894,420 | 7/1975 | Fuchslin | 73/49 |
| 4,852,392 | 8/1989 | Evans | 73/45.5 |

FOREIGN PATENT DOCUMENTS 422692 3/1911 France .
150648 6/1988 Japan .

Primary Examiner—Hezron E. Williams
Attorney, Agent, or Firm—Anthony A. O'Brien

[57] ABSTRACT

A device for the testing of air leaks in a vehicle rim or the like includes a water tank having a predetermined volume of water in the bottom thereof, a mounting and bearings for holding the rim and permitting it to be rotated, a pair of separated pressure chambers sealed by sealing rings and communicating with a manometer which has a discharge valve mounted outside the tank, and a feeder extractor carried by the mounting for manipulation of the rim into and out of the water so as to be checked for air leaks.

1 Claim, 2 Drawing Sheets

APPARATUS FOR CHECKING AIR LEAKS IN VEHICLE TIRE RIMS

This invention pertains to an apparatus for checking air leaks in vehicle tire rims.

BACKGROUND OF THE INVENTION

In the manufacture of vehicle rims, especially those intended for use with tubeless tires, a main problem at the factory level is to have an efficient and effective means of detecting those rims with air leaks in the outlet area of the ring. A number of devices and methods have been tried; however, because they are complicated and are slow in operation, they have not resulted in a reliable check of finding the air leak.

SUMMARY

In addition to being extremely simple, the present invention makes it possible to carry out a large volume of inspections. The apparatus is quite reliable, since it makes the air leak check utilizing air flow in the same manner as takes place when the tire is mounted on the rim.

During operation, the rim is placed in the apparatus, which automatically positions it between two sealing rings that, in conjunction with the body of the apparatus, create a pressure chamber for the rim to be checked, similar to the chamber formed by the tire when used in the vehicle.

This assembly is then engaged at the same time as the chamber is pressurized, with the section of the rim to be checked being immersed in a suitable liquid that will allow the operator to rapidly and easily detect air bubbles created in the liquid should there be leakage.

Figure 1:
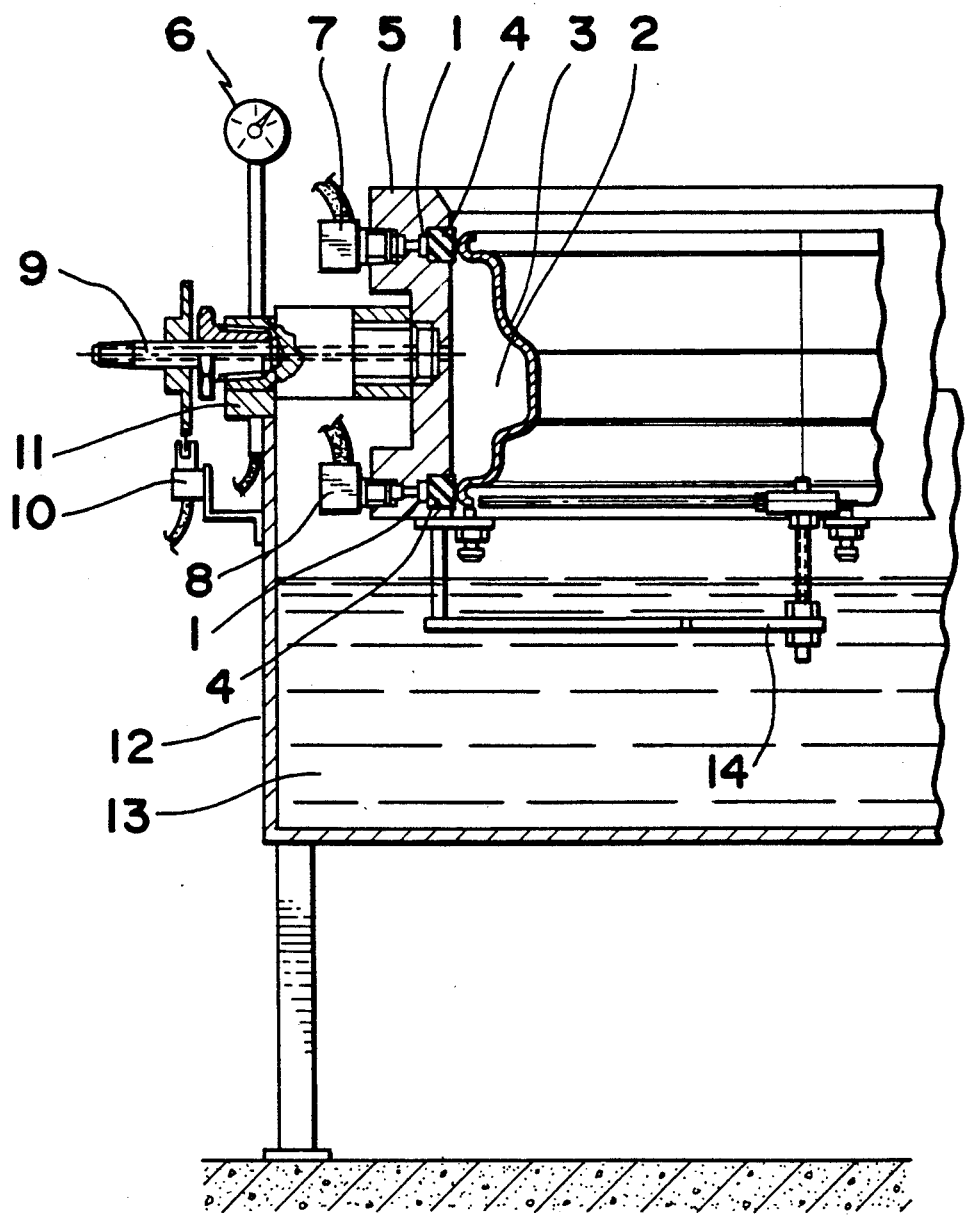
FIG. 1 is a partial side elevational with parts in section of an air leak of an air leak detection apparatus embodying the present invention.

As an aid to better understanding of the objectives, advantages and other aspects of this invention, the following description should be utilized together with the attached drawings, wherein:

FIG. 1 represents the device shown in section in the loading and unloading position, with the pressure chambers (1) and (2)1. Chamber (1) is defined by the rim (3), the floating sealing rings (4) and the body of the apparatus (5). Chamber (2) is defined by the sealing ring (4) and its housing. Chambers (1) and (2) and connected to a manometer (6) that is pressurized and depressurized through ducts (7), (8) and (9), are charged and discharged through an automatic valve (10). Bearings (11) connected to the tank of the apparatus (12) allow the body (5) to rotate around a symmetrical axis thereby immersing the section of the rim (3) to be checked into the suitable liquid (13). The feeder-extractor (14) facilitates handling of the rim to be inspected.

Figure 2:
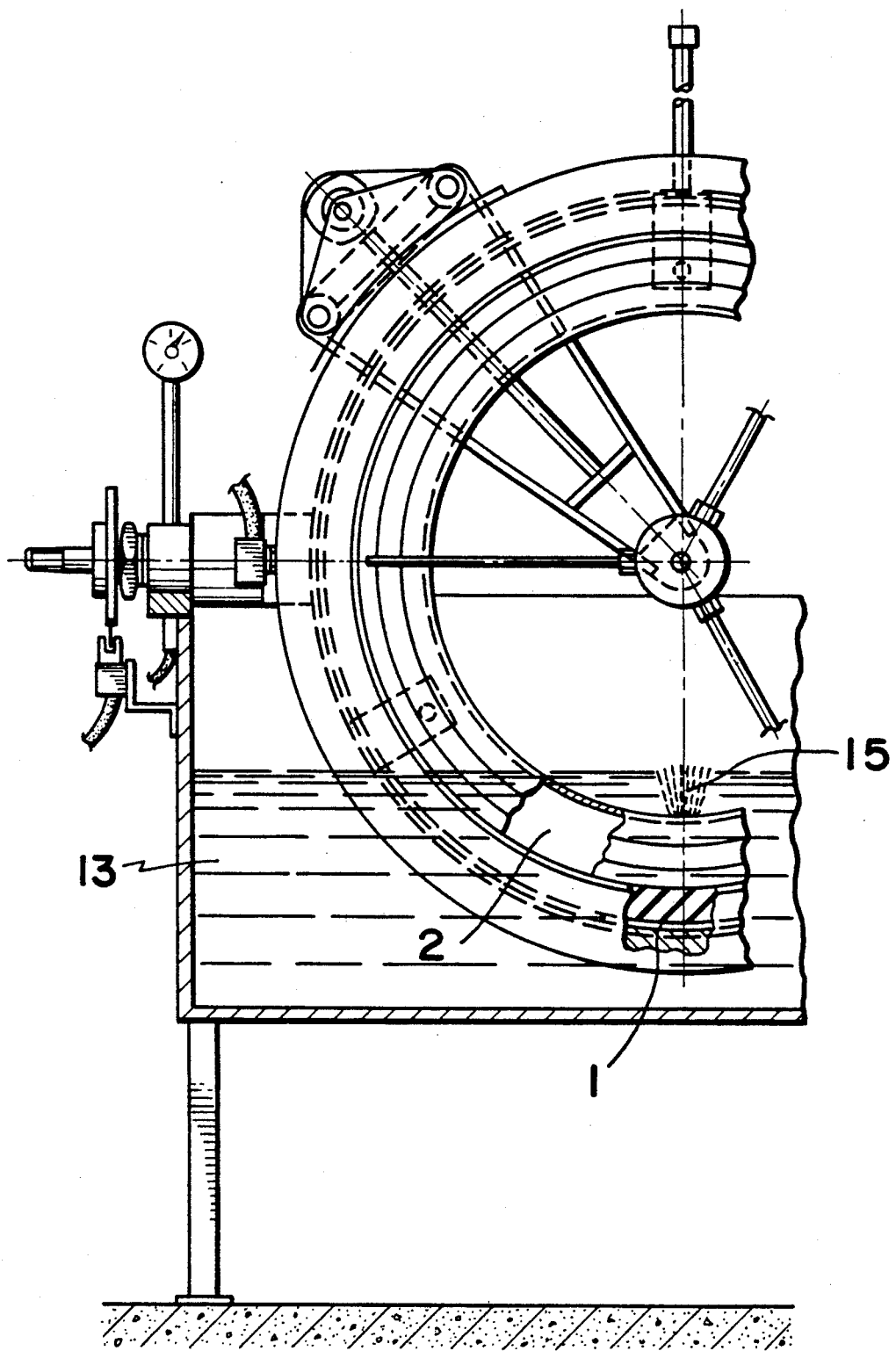
FIG. 2 is a partial side elevational view similar to FIG. 1 but showing the rim to be tested partially submerged in water.

FIG. 2 is a section of the apparatus in the operating position, that is, while carrying out an air leak check. Chambers (1) and (2) are under operating pressure and the rim (3) is immersed in the liquid (13); the operator can easily observe the air bubbles (15) that are leaking from the defective part.

The cross-section of FIG. 1 shows the device in the charging and discharging position. It is apparent that the pressure chamber (1) places the sealing ring (4) in contact with the rim, ensuring a tight seal, and the main pressure chamber (2) shows where leaks are detected. Chamber 1 applies pressure behind the sealing ring (4), and consists of this ring and the place where it is seated on the body (5) of the device. Chamber 2 consists of sealing rings, the body (5) of the device, and the rim (3) to be checked. Chambers 1 and 2 are connected to a manometer (6) and are pressurized or depressurized through ducts 7, 8 and 9, and an automatic valve (10). Bearings (11) connected to the tank (12) allow the body (5) to swivel so that the area of the rim (3) to be checked can be immersed in a suitable liquid (13). The feeder-extractor (14) allows for correct positioning for checking, as well as assisting in removal, leaving the rim (3) in an operating position for each phase.

FIG. 2 also shows a cross-section of the device in the operating position. The chambers (1) and (2) are pressurized, the area to be checked on the rim (3) is immersed in the liquid (13), and the operator can easily detect the air bubbles (15) coming from the defective part.

The purpose of the main chamber (2) is to provide checking conditions that duplicate operating conditions when the rim and tire are in use on the vehicle. This is an original concept in view of the fact that all methods employed up till now to check leak-tightness do so by pressurizing the rim from the inside, exactly the opposite of what happens to the rim during normal use.

Pressure in the chamber is automatically controlled through sensors and checked by using the manometer (6). The feeder-extractor (14) assists in moving the rim to be checked, because as well as ensuring that the same position can be repeated, always stopping automatically in the same place, it allows for a quicker and easier check, saving the operator the trouble of shifting the rim into and out of the proper place in relation to the sealing rings. Moreover, some rims are heavier, rendering the procedure difficult.

I claim:

1. An apparatus for factory checking of air leaks in a vehicle rim (3) in a manner similar to such checking when a tire is on the rim comprising a tank (12) receiving a volume of liquid (13) in its bottom portion and having plurality of bearings (11) thereon, a body mount (5) carried by said bearings 11 so as to rotate about a symmetrical axis whereby a section of the rim (3) is immersed in the liquid (13), said body mount (5) having a wall member facing the rim (3) to define a main pressure chamber (2), a pair of sealing rings (4) in the body mount (5) and engaging an annular bead on the rim (3) to seal the main pressure chamber (2), a minor pressure chamber (1) in said body mount (5) defined by rear surfaces of said sealing rings (4) and respectively communicating with a pair of ducts (7 and 8), a third duct (9) communicating with said main pressure chamber (2), a manometer communicating with said three ducts (7, 8 and 9) and being pressurized and depressurized thereby, a valve (10) communicating with said manometer (6) for charging and discharging said main and minor pressure chambers (2 and 1), and a feeder-extractor (14) carried by said body mount (5) for manipulation of the rim (3) into and out of the liquid (13) so as to be checked for air leaks.

* * * * *